United States Patent [19]
Kohso et al.

[11] Patent Number: 5,313,353
[45] Date of Patent: May 17, 1994

[54] MAGNETIC HEAD SUSPENSION UNITED SUPPORT ARM WITH RIBBED CUT-OUT

[75] Inventors: Hiroshi Kohso, Fujiidera; Makoto Kuwamoto, Hirakata; Michiro Tanaka, Ikoma, all of Japan

[73] Assignee: Matsushita Electric Industrial Co. Ltd., Osaka, Japan

[21] Appl. No.: 918,962

[22] Filed: Jul. 24, 1992

[30] Foreign Application Priority Data

Jul. 25, 1991 [JP] Japan .................. 3-186117

[51] Int. Cl.⁵ .................................................. G11B 5/48
[52] U.S. Cl. ........................................................ 360/104
[58] Field of Search .......................................... 360/104

[56] References Cited

U.S. PATENT DOCUMENTS 4,734,805 3/1988 Yamada et al.
4,992,898 2/1991 Wanlass.

OTHER PUBLICATIONS

T. Ohwe et al. "A Design of High Performance Inline Head Assembly for High-Speed Access", 1990 Digests of Intermag '90, Apr. 17-20, 1990.
European Search Report for European Patent Application No. 92112619.

Primary Examiner—A. J. Heinz
Attorney, Agent, or Firm—Ratner & Prestia

[57] ABSTRACT

A magnetic head slider support device is provided for use in a magnetic disc apparatus. The device comprises a magnetic head, a head slider having the magnetic head, a support arm portion which supports the head slider, and a gimbal spring fixed to a forward end of the support arm portion to attach the head slider. The support arm portion includes a load beam support portion for supporting the head slider and gimbal spring. A load beam plate spring portion applies a force to the head slider, towards a recording surface. A pivotal support arm portion has a pivotal movement center, about which the device pivots. The pivotal movement center pivotally supports the load beam support portion and the load beam plate spring portion at the rear of the support arm portion. The load beam support portion, the load beam plate spring portion and the pivotal support arm portion are formed from a single piece of material of constant thickness. The pivotal support arm portion has a flat face and a side face. The side face has a rib formed by folding a part of the flat face approximately perpendicular to the remainder of the flat face. A cut-out portion having a rib is formed in the flat face. The cut-out portion has first and second sides. The first side is closer to the pivotal movement center than the second side, and is smaller than the second side.

7 Claims, 4 Drawing Sheets

MAGNETIC HEAD SUSPENSION UNITED SUPPORT ARM WITH RIBBED CUT-OUT

BACKGROUND OF THE INVENTION

The present invention generally relates to a supporting arrangement and more particularly, to a magnetic head slider support device for use in a magnetic disc apparatus.

In a magnetic disc apparatus, in order to cause a magnetic head to stably float or be raised above a medium by a predetermined very small height, there has conventionally been widely used a magnetic head slider support device having a WATORAS type suspension.

In FIG. 3 showing one example of a conventional magnetic head slider support device having the WATORAS type suspension generally employed, it is so arranged that the suspension including a load beam 7 and a mount portion 6 supports a slider 2 and also, applies depressing force towards the disc, with the arm portion 5 pivotally supporting the suspension for keeping the magnetic head 1 to be stably raised by a predetermined small height at a target position.

However, the known magnetic head slider support device as referred to above has such problems that, although the load beam 7 and the mount portion 6 constituting the suspension and the arm portion 5 for supporting the suspension and also for transmitting the pivotal movement by a voice coil motor are joined to each other by spot welding and swaging, since the mount portion 6 and the arm portion 5 are larger in thickness, not only the magnetic disc apparatus becomes large in the direction of its height, but manufacturing cost is undesirably raised by two assembling works for the spot welding of the load beam 7 and the mount portion 6, and swaging thereof with the arm portion 5, with a consequent reduction of the manufacturing efficiency, while designing for higher rigidity is further required by raising resonance frequencies both for the load beam 7 and the arm portion 5.

SUMMARY OF THE INVENTION

Accordingly, an essential object of the present invention is to provide a magnetic head slider support device for use in a magnetic disc apparatus, which is small in thickness and light in weight for compact size of the magnetic disc apparatus and simultaneous cost reduction.

Another important object of the present invention is to provide a magnetic head slider support device of the above described type, which is capable of stably raising the magnetic head slider by a small height at a target position.

In accomplishing these and other objects, according to one preferred embodiment of the present invention, there is provided a magnetic head slider support device for use in a magnetic disc apparatus, particularly that dealing with a magnetic disc smaller than 1.8 inches, which comprises a magnetic head, a head slider having said magnetic head, a support arm portion which supports said head slider, by causing a gap-formed side of said magnetic head to confront a recording layer-formed surface of a hard disc at one end side thereof, and a gimbal spring fixed to a forward end side of said support arm portion so as to attach said head slider thereto, wherein said support arm portion further includes a load beam support portion for supporting said head slider and said gimbal spring, a load beam plate spring portion for applying depressing force towards said recording layer-formed surface, to said head slider, and a pivotal support arm portion having a center for rotary motion and pivotally supporting said load beam support portion and said load beam plate spring portion at a rear portion side of said support arm, said load beam support portion, said load beam plate spring portion and said pivotal support arm are integrally formed by the same material, with a constant thickness, and said pivotal support arm portion has a rib means at least at its one side face, and also, a cut-out portion formed in its flat face, said cut-out portion being formed to be smaller at its side towards the rotary center, and provided with at least one rib means.

By the above arrangement according to the present invention, it has become possible to provide a rigid arm portion light in weight and small in thickness, a magnetic head slider support device which can be assembled at high efficiency and at low cost, a magnetic head slider stably raised by a very small height, and consequently, compact magnetic disc apparatus and magnetic disc slider support device light in weight with a small thickness.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
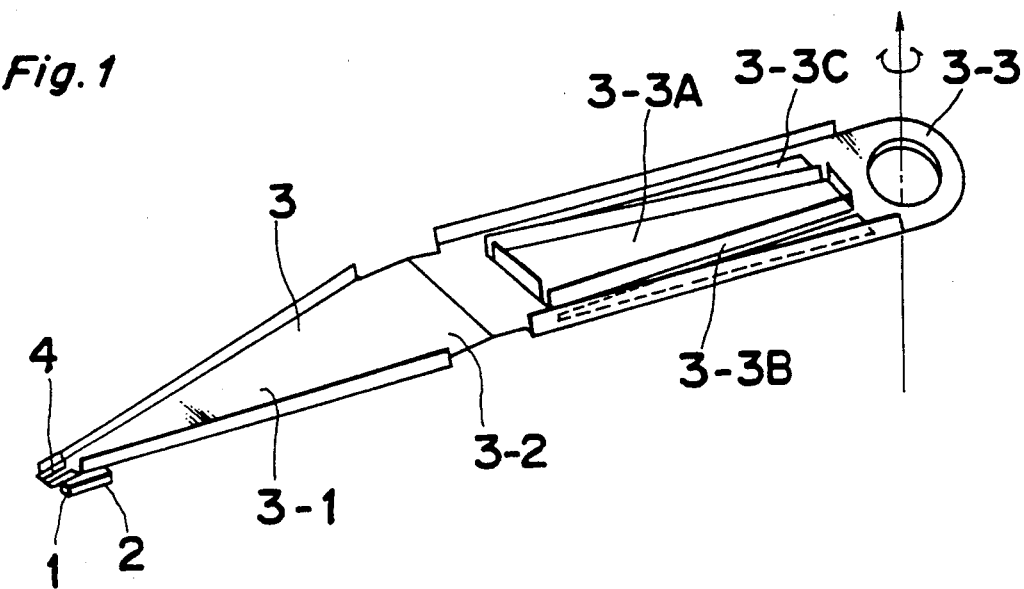
FIG. 1 is a perspective view of a magnetic head slider support device according to one preferred embodiment of the present invention.

Before the description of the present invention proceeds, it is to be noted that like parts are designated by like reference numerals throughout the accompanying drawings.

Figure 2:
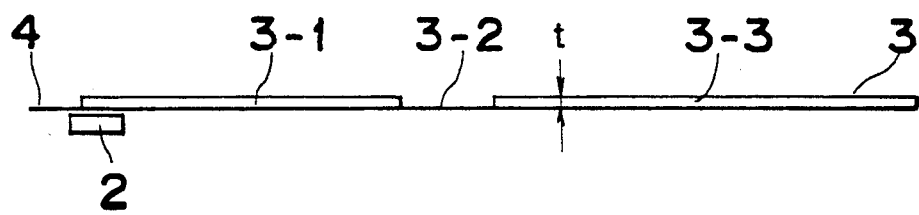
FIG. 2 is a schematic side elevational view of the magnetic head slider support device of FIG. 1 for explaining dimensions thereof.

Referring now to the drawings, there is shown in FIGS. 1 and 2, a magnetic head slider support device according to one preferred embodiment of the present invention, which generally includes a magnetic head 1, a head slider 2 having said magnetic head 1, a support arm portion 3 which supports said head slider 2, by causing a gap-formed side of said magnetic head 1 to confront a recording layer-formed surface of a hard disc (not shown) at one end side thereof, and a gimbal spring 4 fixed to a forward end side of said support arm portion 3 so as to attach said head slider 2 thereto. In the above magnetic head slider device, said support arm portion 3 further includes a load beam support portion 3-1 for supporting said head slider 2 and said gimbal spring 4, a load beam plate spring portion 3-2 for applying depressing force towards said recording layer-formed surface, to said head slider 2, and a pivotal support arm portion 3-3 having a center for rotary motion and pivotally supporting said load beam support portion 3-1 and said load beam plate spring portion 3-2 at a rear portion side of said support arm 3. The load beam support portion 3-1, the load beam plate spring portion 3-2 and the pivotal support arm 3-3 are integrally formed by the same material, with a constant thickness, and the pivotal support arm portion 3-3 has a rib means 3-3B at least at its one side face, a cut-out portion 3-3A formed in its flat face and a damper 3-3C. The cut-out portion 3-3A is formed to be smaller at its side towards the rotary center, and provided with at least one rib means.

By the above arrangement of FIG. 1, the load beam support portion 3-1, the load beam plate spring portion 3-2, and the pivotal support arm 3-3 made of the same material are formed as the support arm of the integral type one member. In the conventional magnetic head slider support device described earlier with reference to FIG. 3, the portion equivalent to the support arm 3 of the magnetic head slider support device of the present invention of FIG. 1 is constituted by the three members, i.e. the load beam 7, the arm portion 5 and the mount portion 6 and the thickness of said known support device in FIG. 3 in the direction of its height is represented from FIG. 4 by an equation.

$$\delta t = tm + t_a + tL - t$$

wherein t is a height of the support arm, tm is a thickness of the mount portion 6, $t_a$ is a thickness of the arm portion 5, and tL is a thickness of the load beam 7, and thus, in the arrangement of FIG. 1 according to the present invention, it is possible to reduce the thickness by δt.

Figure 3:
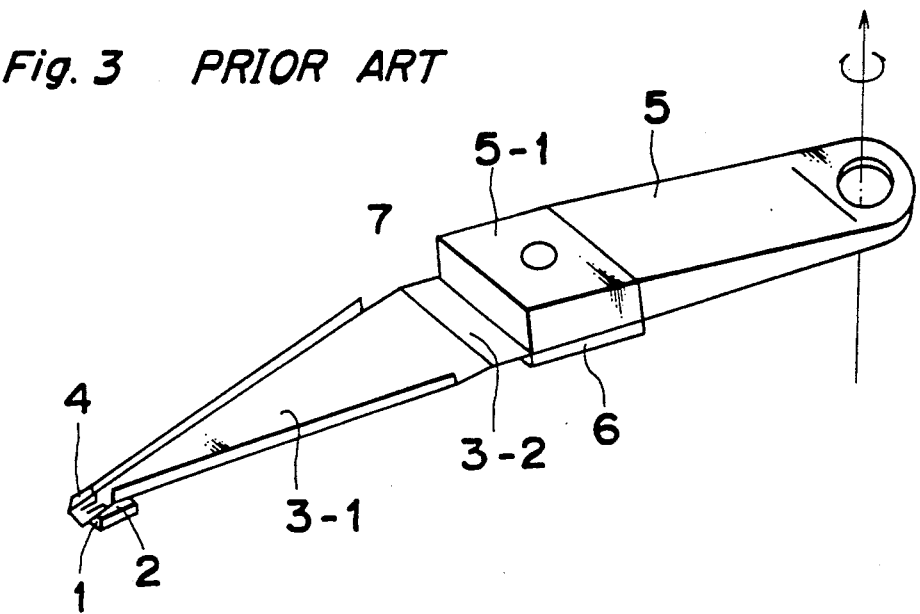
FIG. 3 is a perspective view of a conventional magnetic head slider support device.
Figure 4:
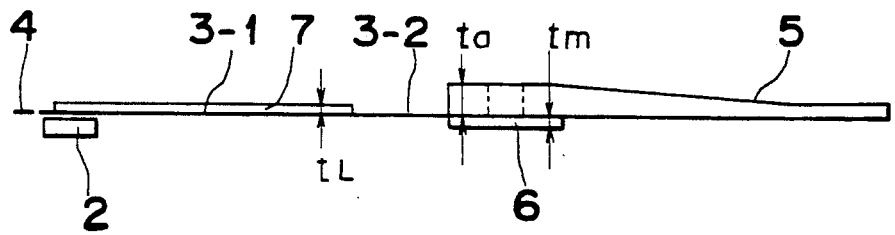
FIG. 4 is a schematic side elevational view of the conventional magnetic head slider support device of FIG. 3 for explaining dimensions thereof.

Moreover, in the conventional arrangement of FIG. 3, although it is so assembled that the mount portion 6 and the load beam 7 are joined by the spot welding, with the arm portion 5 being further joined thereto by swaging, the support arm 3 of the present invention in FIG. 1 can be formed by the same step as in the load beam 7 of the conventional arrangement, and thus, it is possible to achieve cost reduction and higher efficiency in the assembly of the magnetic head slider support device.

Furthermore, as shown in FIG. 1, weight reduction is intended by providing the cut-out portion 3-3A in the pivotal support arm portion 3-3, and by arranging the cut-out portion 3-3A to be smaller at the side of the center of the rotary motion so that a position of a center of gravity of the magnetic head slider support device is located towards the side of its root portion, both of the mass and moment of inertia are reduced for higher rigidity.

Figure 6:
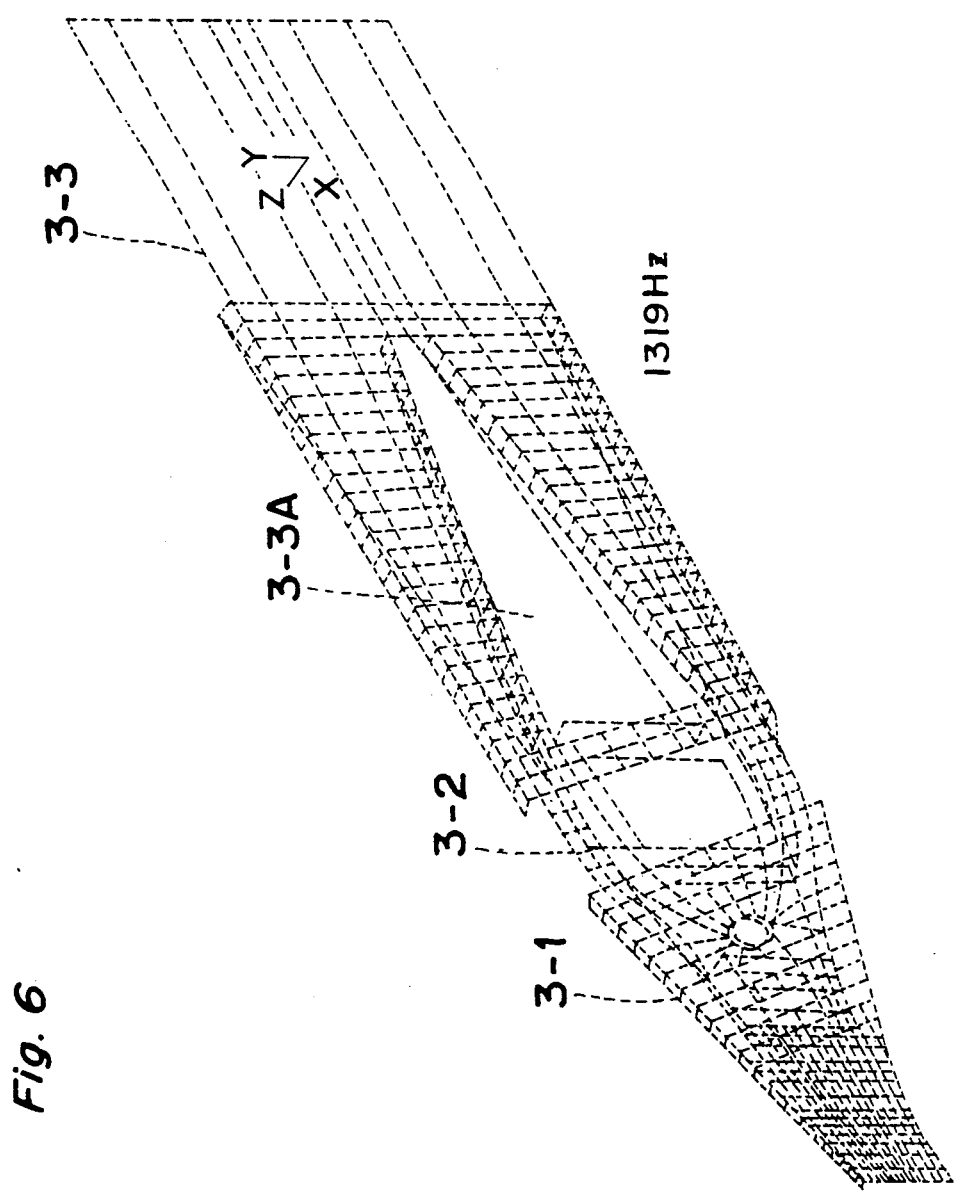
FIG. 6 is a result of analysis of the above magnetic head slider support device by a finite element method in the case where the rotary motion center side of the cut-out portion 3-3A is small.
Figure 7:
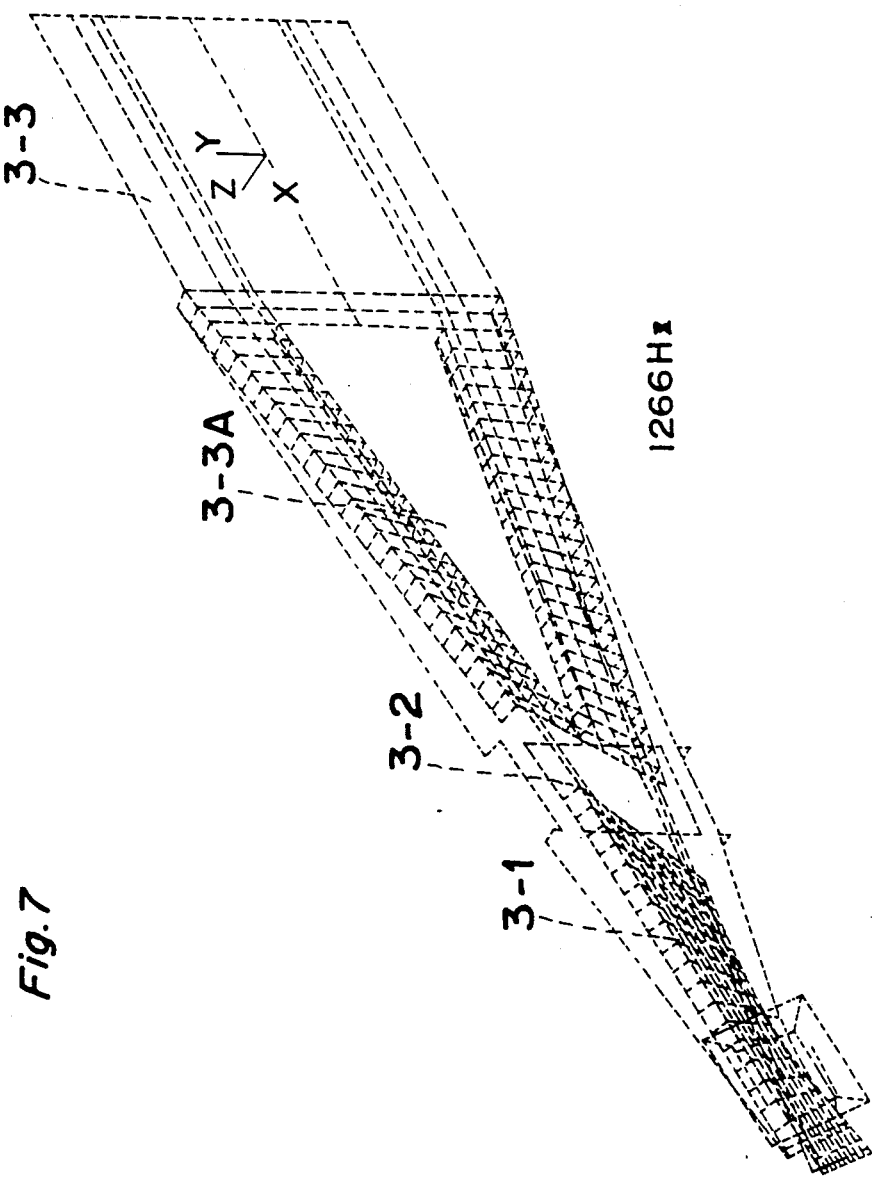
FIG. 7 is a result of analysis of the above magnetic head slider support device by finite element method in the case where the rotary motion center side of the cut-out portion 3-3A is large.

FIG. 6 shows results of analysis of the magnetic head slider support device by a finite element method in the case where the cut-out portion 3-3A is small a its side towards the center of rotary motion, while FIG. 7 denotes the results of analysis thereof by the finite element method in the case where the cut-out portion 3-3A is large at its side towards the center of the rotary motion.

It will be noticed that both of FIGS. 6 and 7 show the vibration mode of twisting, with FIG. 6 having higher resonant frequency and rigidity.

Moreover, by the rib portion 3-3B and the damper 3-3C in FIG. 1 also, deterioration in the vibration characteristics of the pivotal support arm made thinner than that of the conventional arrangement can be improved, thereby making it possible to stably raise the magnetic head slider at the target position.

Furthermore, in the conventional arrangement, although it is required to design a magnetic head slider support device with a high rigidity by taking the resonant modes at the load beam 3, the arm portion 5 and the mount portion 6 into consideration, in the device according to the present invention as described so far, since the load beam support portion 3-1, the load beam plate spring portion 3-2, and the pivotal support arm 3-3 are of the same material and formed into the support arm 3 which is an integral single part, it is possible to design the magnetic head slider support device having a high rigidity by taking into account the resonant mode only of the support arm 3.

As described above, according to the present embodiment, by forming the load beam support portion, the load beam plate spring portion and the pivotal support arm by the same material, into the integral support arm with a constant thickness, and providing the cut-out portion so arranged that the position of its center of gravity is located at the side of the root portion, within the flat plane of the pivotal support arm, with the rib portion further provided thereto and the damper bonded to said flat plane, a compact and thin magnetic head slider support device light in weight can be advantageously realized.

Figure 5:
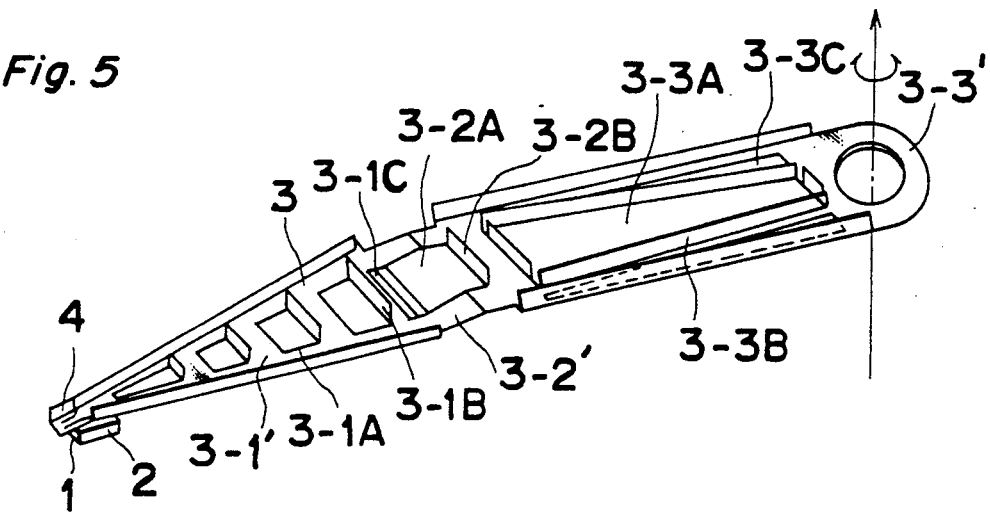
FIG. 5 is a perspective view of a magnetic head slider support device according to another embodiment of the present invention.

It should be noted here that to obtain the similar effects, the arrangement of FIGS. 1 and 2 may be so arranged as in a modified support device in FIG. 5, in which the cut-out portion 3-1A, rib portion 3-1B, and damper 3-1C are provided in the load beam support portion 3-1', and the cut-out portion 3-2A and rib portion 3-2B are formed in the load beam plate spring portion 3-2', while the cut-out portion 3-3A, rib portion 3-3B, and damper 3-3C are provided in the pivotal support arm portion 3-3'.

It should also be noted here that in the foregoing embodiments, although each of the rib portions for the load beam support portion and pivotal support arm, etc. is described as folded upwardly by one time, similar effect may be obtained even if the folding angle and the number of folding times for the respective rib portions are altered.

It should further be noted that, in the foregoing embodiments, the gimbal spring and the magnetic head slider are attached in the same direction as in the longitudinal direction of the support arm, but similar effect can also be achieved even when they are directed, for example, in the normal direction, etc.

As is clear from the foregoing description, according to the present invention, since the magnetic head slider support device includes the magnetic head, the head slider having the magnetic head, the support arm portion which supports the head slider by causing a gap-formed side of the magnetic head to confront a recording layer-formed surface of the hard disc at one end side thereof, and the gimbal spring fixed to the forward end side of the support arm portion so as to attach the head slider thereto, while the support arm portion further includes the load beam support portion for supporting the head slider and the gimbal spring, the load beam plate spring portion for applying depressing force towards the recording layer-formed surface, to the head slider and the pivotal support arm portion having the center for rotary motion and pivotally supporting said load beam support portion and said load beam plate spring portion at the rear portion side of the support arm, and the load beam support portion, the load beam plate spring portion and the pivotal support arm are integrally formed by the same material, with a constant thickness, and the pivotal support arm portion has the rib means at least at its one side face, and also, the cut-out portion formed in its flat face, with the cut-out portion being formed to be smaller at its side towards the rotary center, and provided with at least one rib means. Thus, the compact magnetic head slider support device light in weight can be advantageously realized.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A magnetic head slider support device for use in a magnetic disc apparatus which comprises:
   a magnetic head,
   a head slider having said magnetic head,
   a support arm portion which supports said head slider by causing a gap-formed side of said magnetic head to confront a recording layer-formed surface of a hard disc at one end side thereof, and
   a gimbal spring fixed to a forward end side of said support arm portion so as to attach said head slider thereto, wherein:
   (a) said support arm portion further includes:
      (1) a load beam support portion for supporting said head slider and said gimbal spring,
      (2) a load beam plate spring portion for applying depressing force towards said recording layer-formed surface, to said head slider, and
      (3) a pivotal support arm portion having a pivotal movement center for pivotally moving said magnetic head slider support device about said pivotal movement center, and for pivotally supporting said load beam support portion and said load beam plate spring portion at a rear end of said support arm portion,
   (b) said load beam support portion, said load beam plate spring portion and said pivotal support arm portion are formed from a single piece of material that has a constant thickness, and
   (c) said pivotal support arm portion has:
      (1) a flat face and a side face, said side face having a rib formed by folding a part of said flat face approximately perpendicular to a remainder of said flat face, and
      (2) a cut-out portion formed in the flat face, said cut-out portion having first and second sides, the first side closer to the pivotal movement center than the second side, the first side being smaller than the second side, and said cut-out portion having a further fib.

2. A magnetic head slider support device as claimed in claim 1, wherein said support device is a magnetic head suspension unit support arm adapted for use in a magnetic disc apparatus having a magnetic disc smaller than 1.8 inches in diameter.

3. A magnetic head slider support device as claimed in claim 1, wherein said pivotal support arm portion has a damper in the flat face thereof, the damper comprising a piece of material bonded to the flat face.

4. A magnetic head slider support device as claimed in claim 1, wherein said load beam plate spring portion has a cut-out portion in a flat plane portion of the load beam plate spring portion.

5. A magnetic head slider support device as claimed in claim 4, wherein said cut-out portion in the flat plane portion of said load beam plate spring portion has at least one rib on an inner side thereof.

6. A magnetic head slider support device as claimed in claim 4, wherein said cut-out portion in the flat plane portion of said load beam support portion has at least one rib on an inner side thereof.

7. A magnetic head slider support device as claimed in claim 1, wherein said load beam support portion has a cut-out portion in a flat plane portion of the load beam support portion.

* * * * *